United States Patent
Haga et al.

(10) Patent No.: US 6,947,767 B2
(45) Date of Patent: Sep. 20, 2005

(54) CARD HOLDING STRUCTURE AND PORTABLE TERMINAL APPARATUS HAVING THE SAME

(75) Inventors: Hideo Haga, Yokohama (JP); Koji Kuchiishi, Kawasaki (JP); Toshihiro Higuchi, Kawasaki (JP); Yasunobu Ikeda, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 424 days.

(21) Appl. No.: 09/980,535

(22) PCT Filed: Feb. 23, 2001

(86) PCT No.: PCT/JP01/01367

§ 371 (c)(1),
(2), (4) Date: May 13, 2002

(87) PCT Pub. No.: WO01/63547

PCT Pub. Date: Aug. 30, 2001

(65) Prior Publication Data

US 2003/0134602 A1 Jul. 17, 2003

(30) Foreign Application Priority Data

Feb. 25, 2000 (JP) ........................................ 2000-050191

(51) Int. Cl.[7] .............................................. H04M 1/00
(52) U.S. Cl. ............... 455/558; 455/575.1; 379/433.09; 361/726; 361/727
(58) Field of Search .............................. 455/558, 575.1, 455/90.3, 557.1, 550.1; 235/441, 486; 379/433.09, 428.09; 361/728, 814, 726–727; 439/928.1, 260; 248/221.11

(56) References Cited

U.S. PATENT DOCUMENTS

| | | | | |
|---|---|---|---|---|
| 5,336,877 A | * | 8/1994 | Raab et al. ................. | 235/475 |
| 5,436,969 A | * | 7/1995 | Kobayashi ............. | 379/433.09 |
| 5,699,406 A | * | 12/1997 | Liikanen et al. ............. | 455/558 |
| 5,831,256 A | * | 11/1998 | De Larminat et al. ...... | 235/486 |
| 5,894,597 A | * | 4/1999 | Schwartz et al. ........... | 455/558 |
| 5,933,328 A | * | 8/1999 | Wallace et al. ............. | 361/737 |
| 6,018,669 A | * | 1/2000 | Stoegmueller .............. | 455/558 |
| 6,175,505 B1 | | 1/2001 | Cheng et al. | |
| 6,226,189 B1 | * | 5/2001 | Haffenden et al. .......... | 361/814 |
| 6,343,018 B1 | * | 1/2002 | Takeyama et al. .......... | 361/737 |
| 6,397,081 B1 | * | 5/2002 | Franck et al. ............... | 455/558 |
| 6,518,927 B2 | * | 2/2003 | Schremmer et al. ........ | 343/702 |
| 6,563,715 B2 | * | 5/2003 | Villain et al. ............... | 361/800 |
| 2003/0195020 A1 | * | 10/2003 | Kubo ...................... | 455/575.1 |

FOREIGN PATENT DOCUMENTS

| | | | | |
|---|---|---|---|---|
| JP | 6-29241 | | 4/1994 | |
| JP | 6-505103 | | 6/1994 | |
| JP | 10-106674 | | 4/1998 | |
| NL | WO 9825424 | * | 6/1998 | ............ H04Q/7/32 |
| WO | WO 98/13784 | | 4/1998 | |
| WO | WO 98/25424 | | 6/1998 | |

* cited by examiner

Primary Examiner—William Trost
Assistant Examiner—Sharad Rampuria
(74) Attorney, Agent, or Firm—Pearne & Gordon LLP

(57) ABSTRACT

A card is slid and fitted to a card connector fixed in a card-fitting recessed portion provided inside a reverse surface-side housing of a portable terminal apparatus. A front portion of the card is held by card holding portions provided in a front portion, as viewed in a card sliding direction, of the card connector, and a rear portion of the card is held by an inner wall surface of a cover-cum-battery of the reverse surface-side housing. A housing-side stopper is provided on a bottom surface of the card-fitting recessed portion. The housing-side stopper is formed by a rectangular resilient piece having one end fixed to a bottom surface of the card-fitting recessed portion.

10 Claims, 8 Drawing Sheets

CARD LOADING
DIRECTION

CARD HOLDING STRUCTURE AND PORTABLE TERMINAL APPARATUS HAVING THE SAME

This application claims the benefit of International Application No. WO 01/63547, which was published in English on Aug. 30, 2001.

TECHNICAL FIELD

The present invention relates to a portable terminal apparatus such as a portable telephone, and more particularly to a structure for holding an identification card.

BACKGROUND ART

Conventionally, as a structure for holding a subscriber identification module (SIM) card, which is an identification card for a portable telephone, one shown in FIG. 8 is known. It should be noted that, in the description that follows, the direction in which the identification card is loaded is assumed to be the forward direction. In FIG. 8, a card-fitting recessed portion 42 is provided in the inner surface of a housing 41 of a portable telephone. In addition, a card connector 43 is disposed. The card connector 43 has two rows of contact portions 44 and 45 at forward and rearward positions, and has a pair of holding portions 46 respectively disposed at substantially intermediate positions between the two rows so as to hold an identification card (hereafter referred to as the card) 51 from left- and right-hand sides. The holding portions 46 are formed by bending a metal plate, and their one ends are respectively fixed to left-and right-hand end portions of the card connector 43. By virtue of their resiliency, the holding portions 46 hold the fitted card 51.

In the above-described construction, when the card 51 is loaded, a front end of the card 51 is adjusted to the position of the rear ends of the holding portions 46, is passed below the holding portions 46, and is slid until it abuts against an inner wall surface of a front end 42a of the card-fitting recessed portion 42. Accordingly, the amount of the card 51 slid becomes the length indicated at L in the drawing. An inner wall surface of a rear end 42b of the card-fitting recessed portion 42 serves as a stopper for preventing the fitted card 51 from coming off.

However, with the above-described card holding structure, there has been a problem in that the amount of the card slid is long. In addition, since the inner wall surface of the rear end of the card-fitting recessed portion is used as the stopper, it has been necessary to lift the rear end side of the card upward and deflect it at the time of removing the card. For this reason, there has been a problem in that a mechanical stress is undesirably applied to the card.

DISCLOSURE OF THE INVENTION

The invention has been devised to overcome the above-described problems, and its object is to provide a card holding structure which reduces the amount of the card slid. Another object of the invention is to provide a card holding structure capable of removing the card without deflecting it as well as a portable terminal apparatus having the same.

In accordance with the invention, there is provided a card holding structure in which a card is slid and fitted to a card connector fixed in a card fitting portion provided inside a housing of a portable terminal apparatus and is held, characterized in that a front portion of the card is held by a card holding portion provided in a front portion, as viewed in a card sliding direction, of the card connector, and that a rear portion of the card is held by an inner wall surface of a cover of the housing of the portable terminal apparatus. By virtue of this construction, the card can be held reliably, and the amount of the card slid can be reduced.

In addition, the card holding structure is characterized in that the card fitting portion is recessed in an inner surface of the housing, and that a housing-side stopper is provided which is formed by a rectangular resilient piece having one end fixed to a bottom surface of the card fitting portion. By virtue of this construction, the card can be removed without deflecting it.

BEST MODE FOR CARRYING OUT THE PRESENT INVENTION

Hereafter, a description will be given of an embodiment of the invention.

Figure 1:
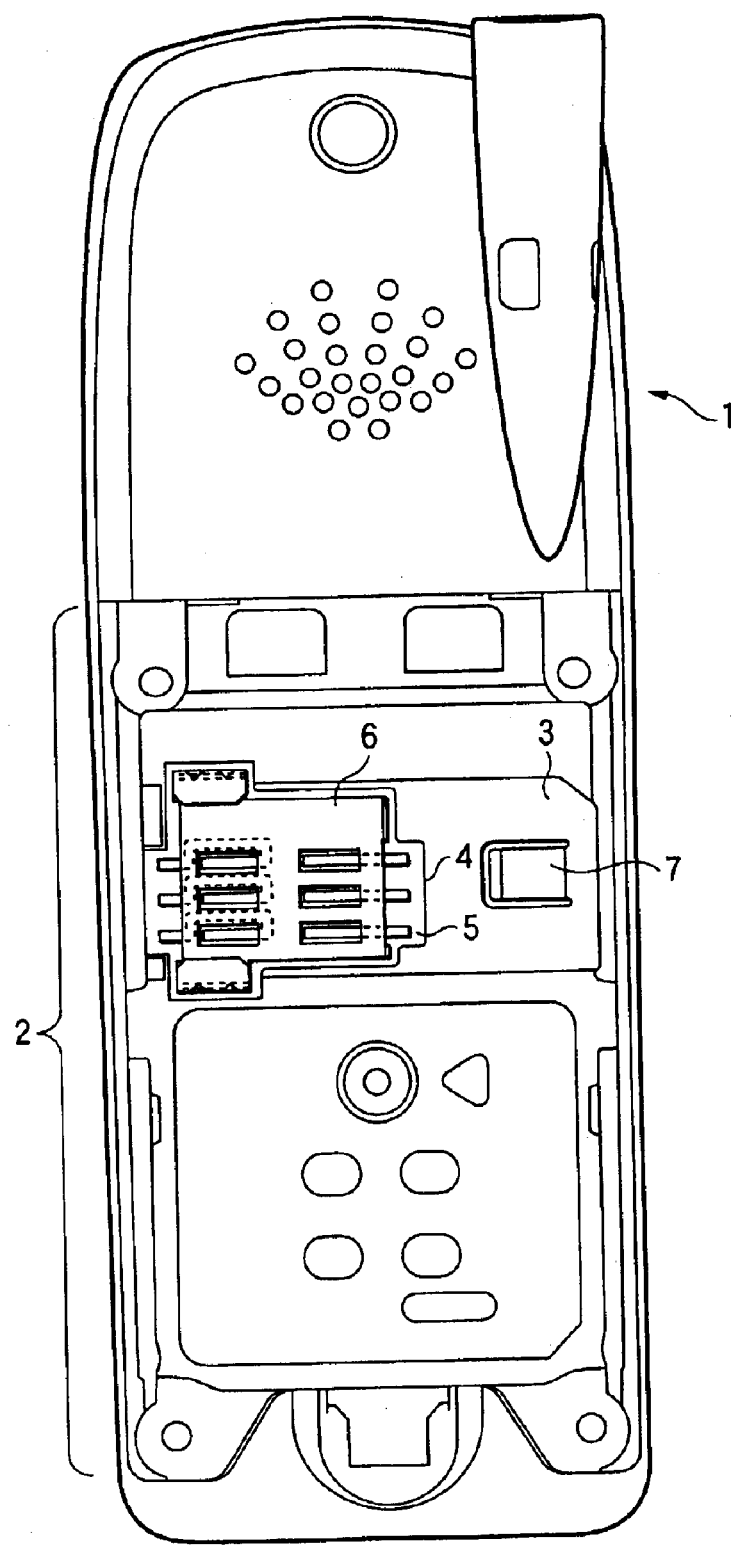
FIG. 1 is a diagram for explaining a portable telephone in accordance with an embodiment of the invention.

FIG. 1 is a diagram for explaining a portable telephone in accordance with an embodiment of the invention. This drawing shows a reverse surface-side housing 1 of the portable telephone. An opening 2 for attaching a cover-cum-battery is formed in this reverse surface-side housing 1 in such a manner as to extend from a substantially central portion to a lower edge thereof. A card-fitting recessed portion 3 for fitting a card is provided in the opening 2. The card-fitting recessed portion 3 is formed in a substantially rectangular shape on the inner surface of the reverse surface-side housing 1 so that the a card can be fitted in a direction (from right to left in the drawing) perpendicular to the longitudinal direction of the reverse surface-side housing 1. In addition, a through hole 4 is formed in the card-fitting recessed portion 3 in such a manner as to extend from the center to the front side thereof (left-hand side in the drawing) as viewed in the card fitting direction, and a card connector 6 is fixed to a printed circuit board 5 exposed therein. Further, a housing-side stopper 7 for preventing the fitted card from coming off is provided in a rear portion (right-hand side in the drawing) of the card-fitting recessed portion 3.

Figure 2:
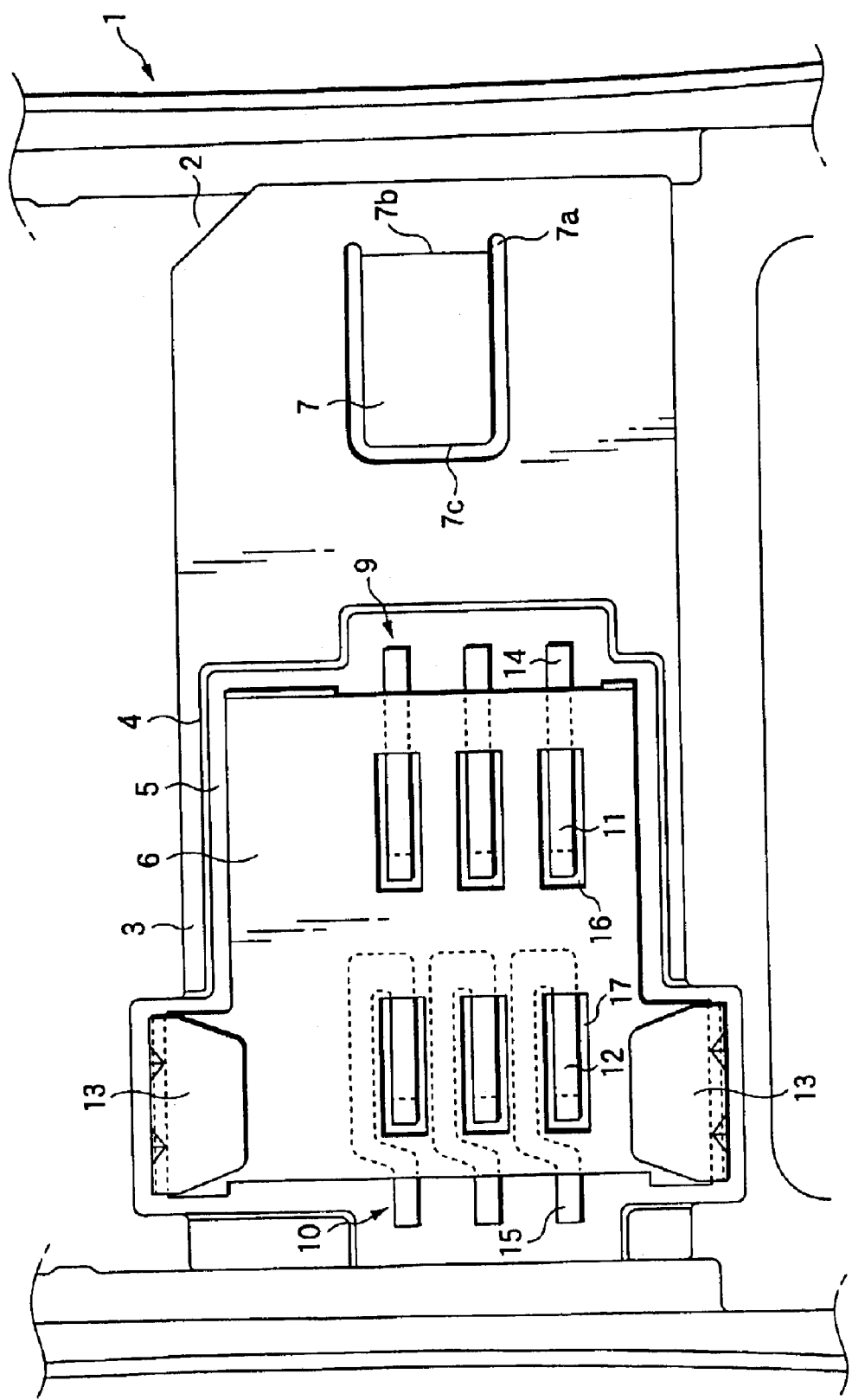
FIG. 2 is an enlarged view of an essential portion shown in FIG. 1.
Figure 3:
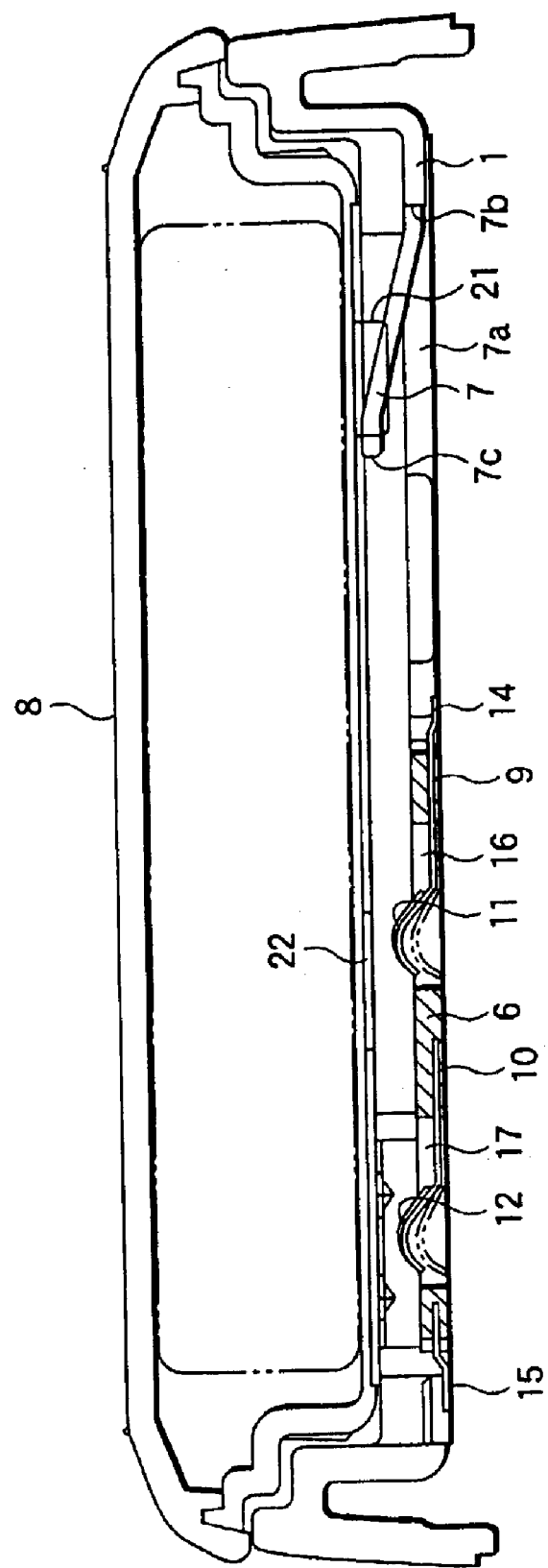
FIG. 3 is an enlarged cross-sectional view of a state in which a cover-cum-battery is fixed.
Figure 4:
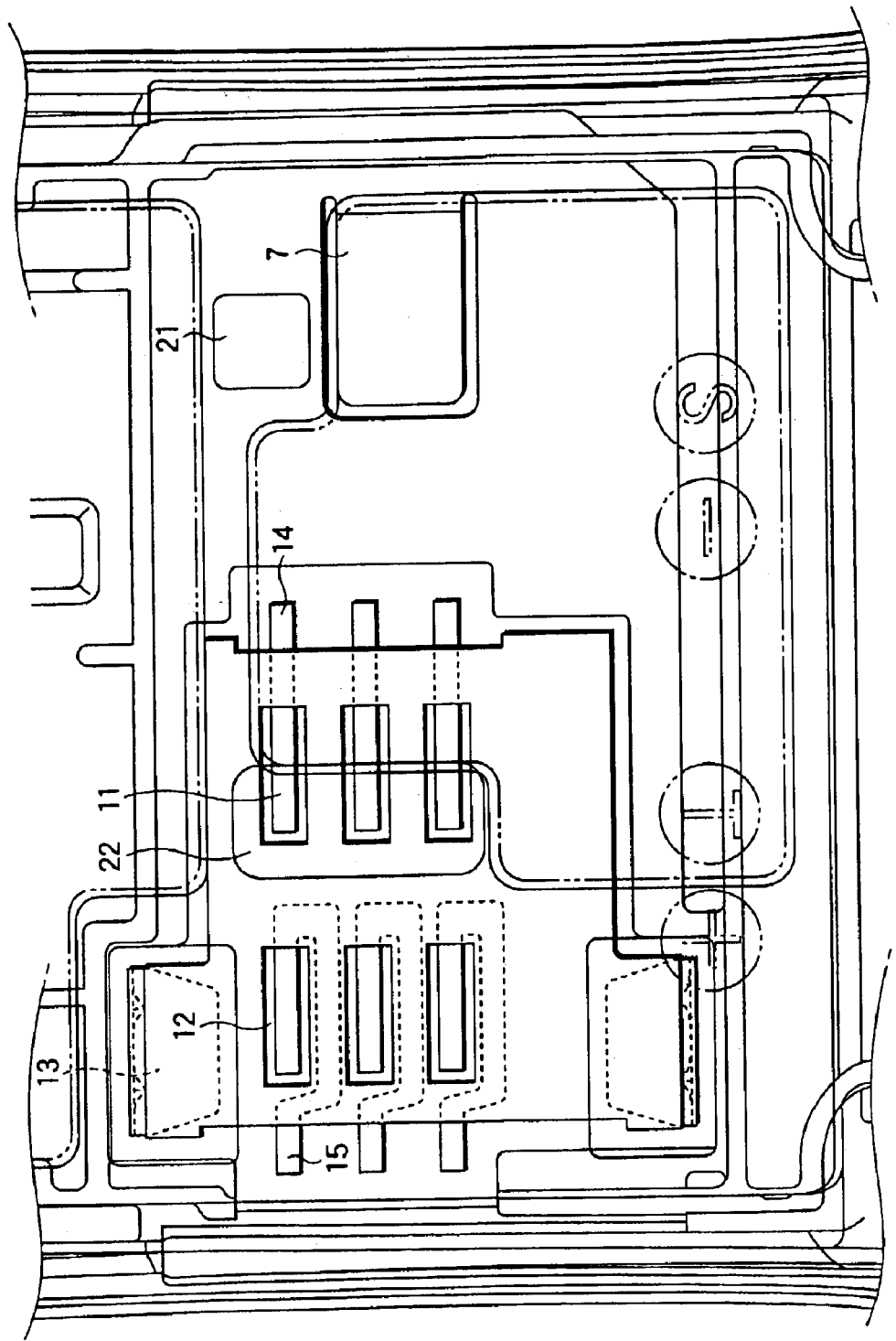
FIG. 4 is a perspective view taken from the reverse surface side in FIG. 3.

FIG. 2 is an enlarged view of an essential portion shown in FIG. 1, and FIG. 3 is an enlarged cross-sectional view of a state in which the cover-cum-battery is fixed. Further, FIG. 4 is a perspective view taken from the reverse surface side in FIG. 3 (from the lower side in FIG. 3). As shown in FIGS. 2 and 3, the card connector 6 has two sets of contact members 9 and 10, which are respectively arranged on front and rear sides of a plate-like base, as well as a pair of holding portions 13. The base has a substantially rectangular planar shape, and its front edge side in the card fitting direction is formed to be wide.

The set of three contact members 9, which are arranged on a rear portion in the card fitting direction, are formed by thin metal pieces, and joining portions 14 which are soldered to the printed circuit board 5 of the main body of the portable telephone are respectively provided at their rear ends, while contact portions 11 which come into contact with the contacts of the card are respectively provided at their front ends. Each contact member 9 extends in such a manner as to creep into the interior of the base from an end face (rear end face) of the base on its card fitting side and then advance straight. Then, the contact member 9 is exposed from a wall surface of a through hole 16 with a rectangular cross section formed in the base in correspondence with the contact portion 11. Further, the contact member 9 is bent upward from a substantially central portion in the through hole 16, becomes higher than the obverse surface (upper surface) of the base and forms a peak, and the contact member 9 is subsequently bent downward to its terminating end. In other words, the contact portion 11 is bent in a chevron shape and has a terminating end in the card fitting direction.

Meanwhile, the set of three contact members 10, which are arranged on a front portion in the card fitting direction, are formed by thin metal pieces, and joining portions 15 which are soldered to the printed circuit board 5 of the main body of the portable telephone are respectively provided at their front ends, while contact portions 12 which come into contact with the contacts of the card are respectively provided at the other ends. Each contact member 10 extends in such a manner as to creep into the interior of the base from an end face (front end face) of the base opposite to its card fitting side, and is bent leftward before a through hole 17 with a rectangular cross section formed in the base in correspondence with the contact portion 12. Then, the contact member 10 advances straight in parallel with the through hole 17, and its direction is reversed after the contact member 10 has gone beyond the through hole 17, and the contact member 10 is exposed from a rear-side wall surface of the through hole 17. Further, the contact member 10 is bent upward in the through hole 17, becomes higher than the obverse surface (upper surface) of the base and forms a peak, and the contact member 10 is subsequently bent downward to its terminating end. In other words, the contact portion 12 is also bent in a chevron shape and has a terminating end in the card fitting direction.

The pair of holding portions 13 are respectively attached to both side portions of a widened portion of the base. The holding portions 13 are formed by bending a metal plate, and their one ends are respectively fixed to the side portions of the widened portion. By virtue of their resiliency, the holding portions 13 hold both sides of the front end portion of the fitted card.

The housing-side stopper 7 is formed by a substantially rectangular resilient piece, its rear end 7b is fixed to the bottom surface of the card-fitting recessed portion 3, and the housing-side stopper 7 extends slightly diagonally upward from the rear end 7b toward its front end 7c. A cutout 7a is formed around the housing-side stopper 7 excluding its rear end. The housing-side stopper 7 is preferably molded integrally with the bottom surface of the card-fitting recessed portion 3.

A battery-side stopper 21 and a pressure contact portion 22 are provided on the reverse surface (lower side in FIG. 3) of a cover-cum-battery 8. As shown in FIG. 4, the battery-side stopper 21 has a substantially square planar shape, and is provided projectingly on the reverse surface of the cover-cum-battery 8 so as to be located rightwardly (on the upper side in FIG. 4) adjacent to the housing-side stopper 7 on the bottom surface of the card-fitting recessed portion 3 in an opposing manner. In addition, the pressure contact portion 22 has a substantially rectangular planar shape, and is provided projectingly on the reverse surface of the cover-cum-battery 8 so as to oppose the contact portions 11 of the card connector 6.

Figure 6:
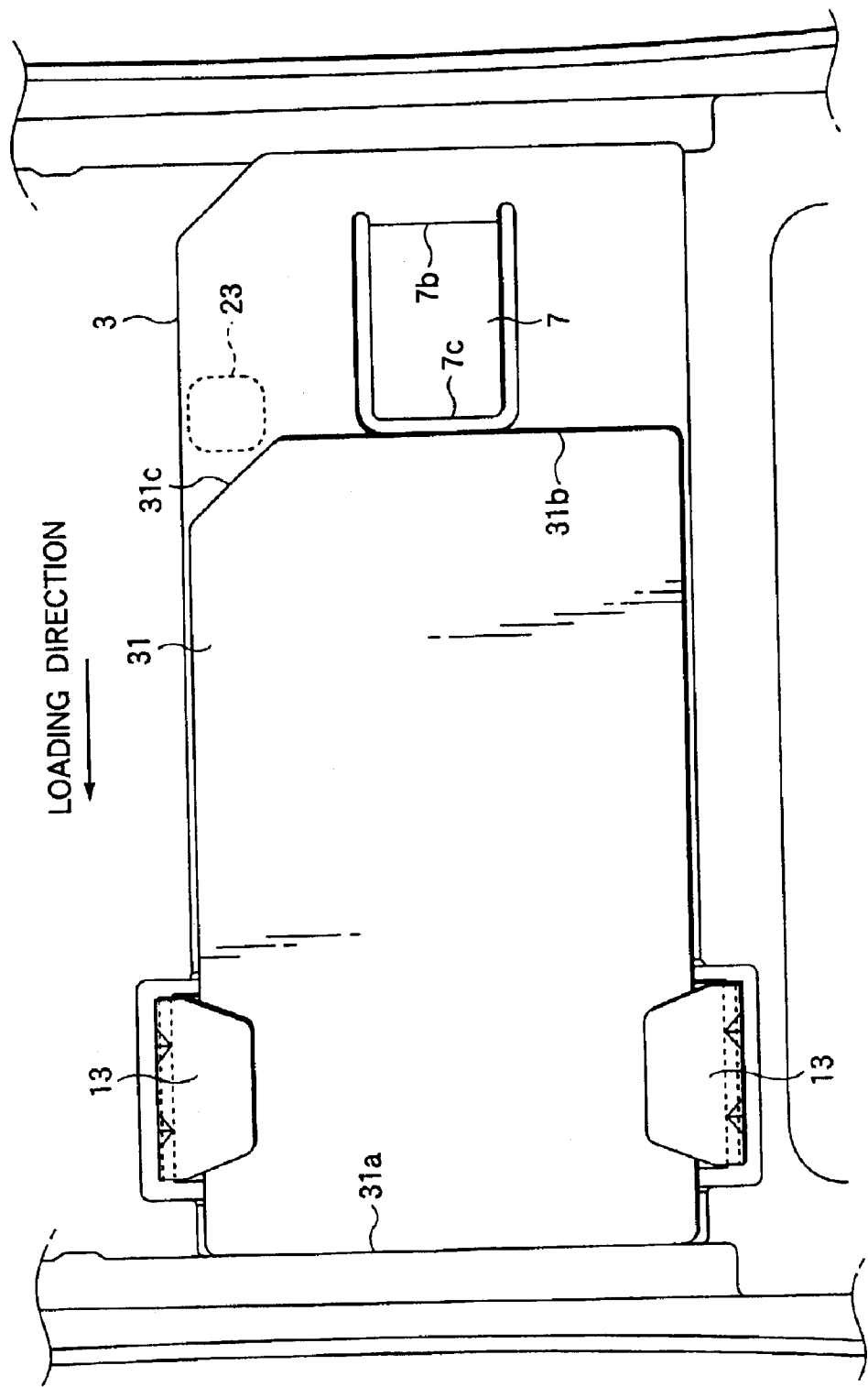
FIG. 6 is a plan view illustrating a state in which the fitting of the card has been completed.
Figure 7:
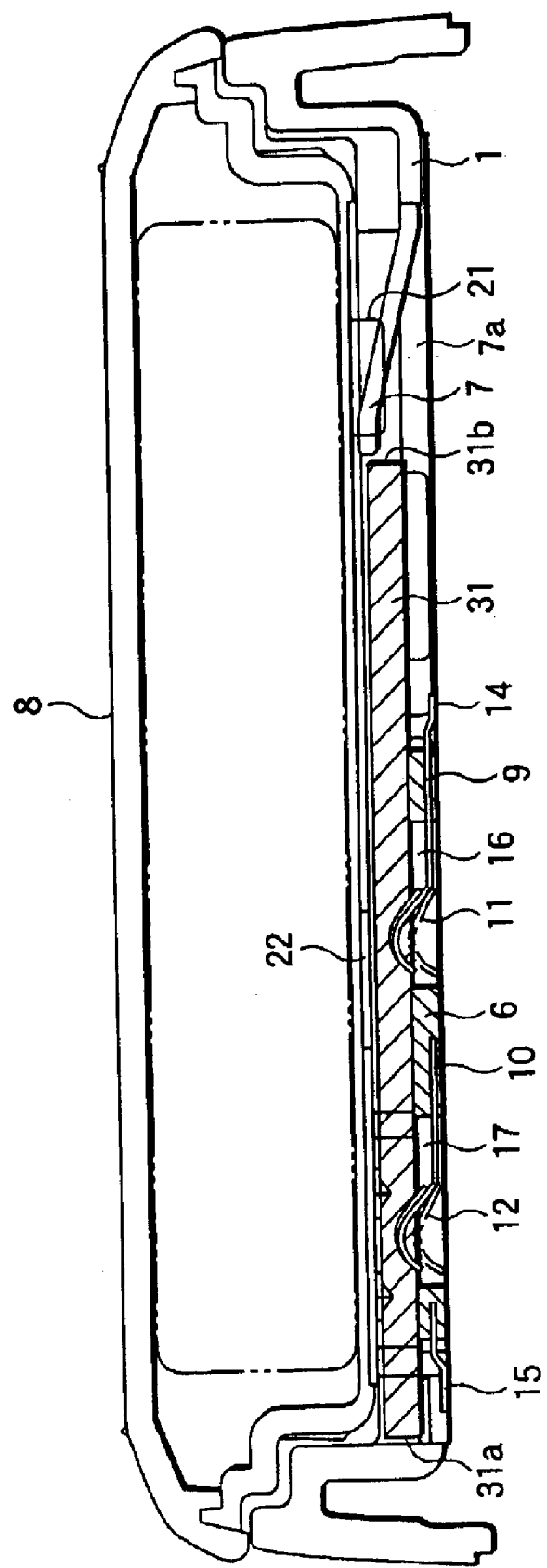
FIG. 7 is a cross-sectional view illustrating a state in which the fitting of the card has been completed.
Figure 8:
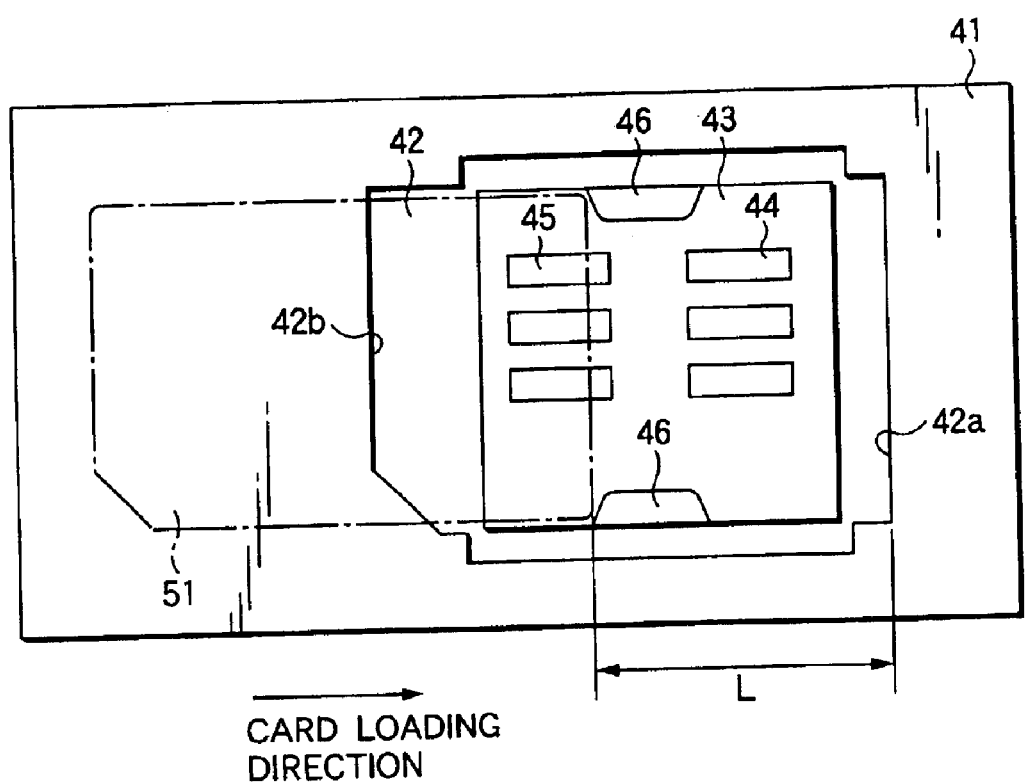
FIG. 8 is a diagram for explaining a conventional structure for holding an identification card.

Next, referring to FIGS. 2 to 7, a description will be given of the operation of loading and unloading the card in the portable telephone constructed as described above. Here, FIG. 5 is a plan view illustrating a state in which the fitting of the card is started, FIG. 6 is a plan view illustrating a state in which the fitting of the card has been completed, and FIG. 7 is a cross-sectional view illustrating a state in which the fitting of the card has been completed.

Figure 5:
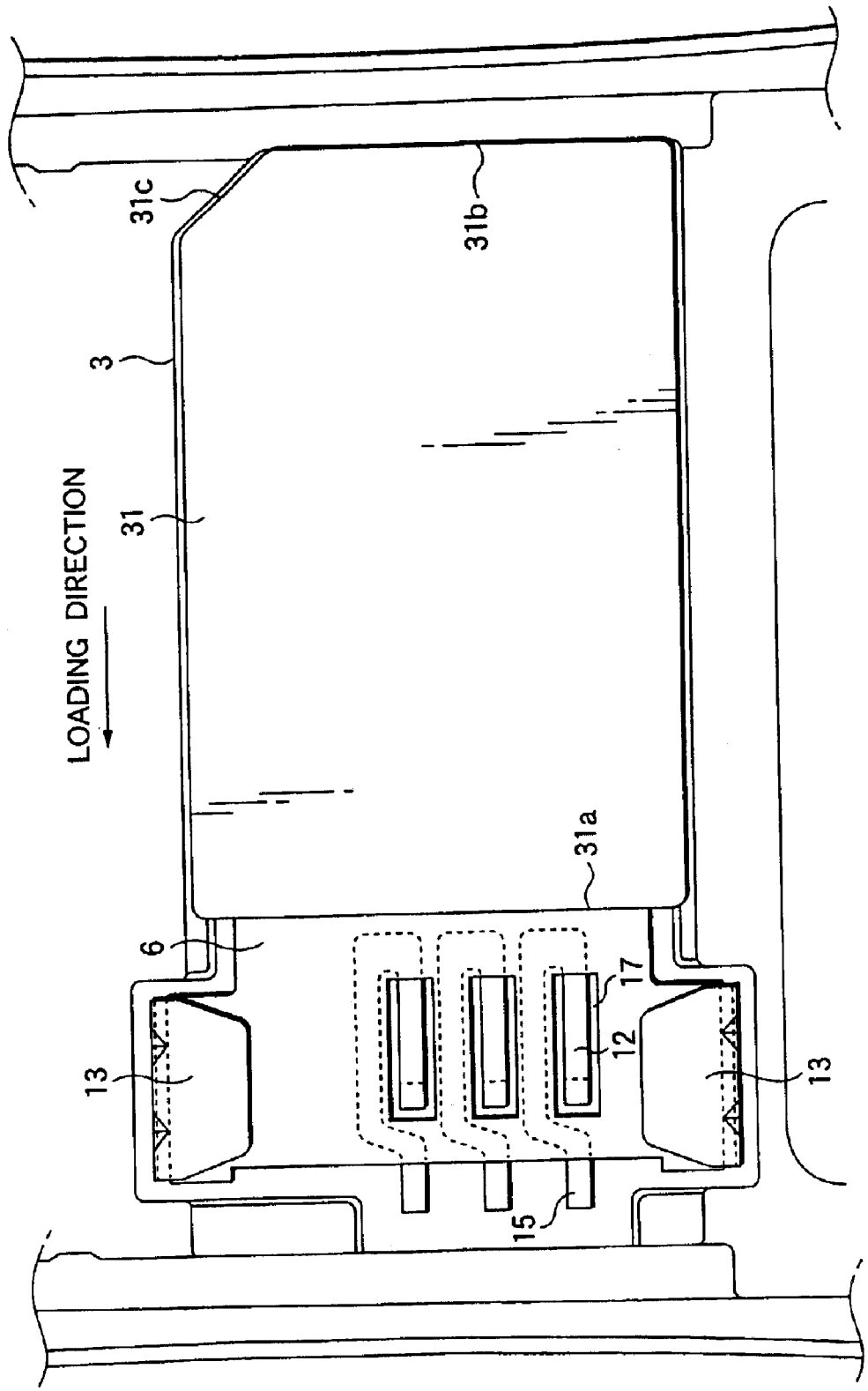
FIG. 5 is a plan view illustrating a state in which the fitting of the card is started.

First, as shown in FIG. 5, a front end 31a of a card 31 is adjusted to a position close to rear ends of the holding portions 13, and a rear portion of the card 31 is pressed toward the bottom surface of the card-fitting recessed portion 3 against the resiliency of the housing-side stopper 7. The housing-side stopper 7 is pressed by the lower surface of the card 31, is deflected downward around its rear end 7b as a center, and becomes horizontal. Next, the card 31 is slid leftward in the drawing. At this time, both side ends of the card 31 are guided by side wall surfaces of the card-fitting recessed portion 3. Then, as shown in FIGS. 6 and 7, the front end 31a of the card 31 pass below the holding portions 13 and stop at a predetermined position. When the front end 31a of the card 31 is stopped at the predetermined position, a rear end 31b is located forwardly of the front end 7c of the housing-side stopper 7, so that the housing-side stopper 7 is deflected upward around its rear end 7b as a center due to its resiliency. Accordingly, both sides of the front portion of the card 31 are held by the holding portions 13, with the result that a satisfactory state of contact between the contact portions 12 of the card connector 6 and the contact portions (not shown) of the card 31 is maintained. In addition, the card 31 is prevented from coming off in the rearward direction by the housing-side stopper 7. Further, as the cover-cum-battery 8 is fixed in this state, the card 31 is pressed at a position above the contact portions 11 by the pressure contact portion 22, thereby maintaining a satisfactory state of contact between the contact portions 11 and the contact portions (not shown) of the card 31. In addition, the battery-side stopper 21 also prevents the card 31 from coming off in the rearward direction.

On the other hand, when the card 31 is removed, after the housing-side stopper 7 is pressed downward and deflected until it becomes horizontal, the card 31 is slid in the rearward direction. When the card 31 returns to the position shown in FIG. 5, the rear portion of the card 31 is lifted up from the bottom surface of the card-fitting recessed portion 3 due to the resiliency of the housing-side stopper 7, so that the card 31 can be removed easily.

Thus, in this embodiment, since the holding portions 13 are disposed at the front portion of the card connector, as compared with the conventional example in which the holding portions are disposed in the central portion of the card connector, the amount of the card slid becomes short, so that the card fitting portion can be made compact. Further, the decline in the holding force with respect to the rear portion of the card due to the disposition of the holding portions in the front portion is overcome by the provision of the pressure contact portion 22. In addition, as the stopper 7 formed by a resilient piece having one end fixed to the bottom surface of the card-fitting recessed portion 3 is provided, it becomes possible to remove the card without deflecting it.

It should be noted that the invention is not limited to the above-described embodiment and, for example, modifications such as those shown in (1) and (2) below are possible.

(1) The housing-side stopper 7 is disposed in a state in which the housing-side stopper 7 in terms of its orientation is rotated 90 degrees clockwise or counterclockwise. This makes it possible to avoid a situation in which the rear end 31b of the card 31 is erroneously made to creep below the housing-side stopper 7 at the time of removal of the card 31.

(2) Since a cutout 31c is formed at a corner of the card 31, if an arrangement is provided such that, for example, the cover-side stopper is disposed in a region 23 surrounded by the broken line in FIG. 6 in such a manner as to oppose the cutout 31c, it is possible to avoid a situation in which the card 31 is erroneously loaded by making a mistake with respect to the front and rear sides or the obverse or reverse sides of the card 31.

INDUSTRIAL APPLICABILITY

As described above, the front portion of the card is held by a pair of card holding portions provided in a front portion, as viewed in a card sliding direction, of the card connector, and the rear portion of the card is held by an inner wall surface of the cover of the housing of the portable terminal apparatus. Accordingly, there are provided a card holding structure having an outstanding advantage in that the card can be held reliably and the card fitting portion can be made compact, as well as a portable terminal apparatus having the same.

In addition, the arrangement provided is such that the card fitting portion is recessed in an inner surface of the housing of the portable terminal apparatus, and a housing-side stopper is provided which is formed by a rectangular resilient piece having one end fixed to the bottom surface of the card fitting portion. Accordingly, there are provided a card holding structure having an outstanding advantage in that the card can be removed without deflecting it, as well as a portable terminal apparatus having the same.

While only certain embodiments of the invention have been specifically described herein, it will be apparent that numerous modifications may be made thereto without departing from the spirit and scope of the invention.

What is claimed is:

1. A card holding structure in a portable terminal apparatus, for fitting a card by sliding and for holding the card, comprising:

a card connector fixed in a card fitting portion provided inside a housing of the portable terminal apparatus;

a holding portion provided in a front portion, as viewed in a card sliding direction, of the card connector, and holding a front portion of the card;

an inner wall surface of a cover for the housing of the portable terminal apparatus, said inner wall surface holding a rear portion of the card; and a housing-side stopper formed by a resilient piece having an end fixed to the card fitting portion.

2. The card holding structure according to claim 1, wherein said card connector has two sets of contact portions which are respectively disposed at forward and rearward positions in the card sliding direction, so as to establish electrical contact with the card.

3. The card holding structure according to claim 1, wherein the card fitting portion includes a recessed portion recessed in an inner surface of the housing, and a sliding movement of the car is guided by side wall surfaces of the recessed portion.

4. The card holding structure according to claim 1, wherein a tip portion of the housing-side stopper is directed toward a direction perpendicular to the card sliding direction.

5. The card holding structure according to claim 1, wherein the cover serves as a battery housing.

6. The card holding structure according to claim 1, wherein the cover includes a cover-side stopper projecting toward the card fitting portion.

7. The card holding structure according to claim 6, wherein the cover-side stopper prevents the card from coming off rearward in the card sliding direction.

8. The card holding structure according to claim 6, wherein the cover-side stopper presses the card at a position above a contact portion of the card.

9. The card holding structure according to claim 6, wherein the cover-side stopper is disposed in a region opposing the cutout provided at a corner of the card.

10. A portable terminal apparatus comprising:

a housing including a card connector into which a card is slidingly fitted and is held, the car connector including a holding portion provided in a front portion, as viewed in a card sliding direction, of the car connector;

a cover engaging said housing and including a pressing portion provided on an inner wall surface thereof so as to press a rear portion of the card; and a housing-side stopper formed by a resilient piece having an end fixed to the housing.

* * * * *

UNITED STATES PATENT AND TRADEMARK OFFICE
CERTIFICATE OF CORRECTION

PATENT NO. : 6,947,767 B2
DATED : September 20, 2005
INVENTOR(S) : Haga et al.

It is certified that error appears in the above-identified patent and that said Letters Patent is hereby corrected as shown below:

Column 6,
Line 20, delete "car" and insert -- card --.

Signed and Sealed this

Third Day of January, 2006

JON W. DUDAS
*Director of the United States Patent and Trademark Office*